Inventors
Ben Davies
Frank H. Walther

Inventors
Ben Davies
Frank H. Walther 3,180,743
REFRACTORY AND METHOD OF MAKING SAME
Ben Davies, Pittsburgh, and Frank H. Walther, Bethel Park, Pa., assignors to Harbison-Walker Refractories Company, Pittsburgh, Pa., a corporation of Pennsylvania
Filed Mar. 29, 1962, Ser. No. 183,596
16 Claims. (Cl. 106—59)

This invention relates to refractories and methods of fabrication thereof. In one aspect, the invention relates to improved chrome ore and magnesia refractories.

This invention has utility in both chrome-magnesia and magnesia-chrome refractory materials, but for simplicity in the following discussion, the term "magnesite-chrome" is sometimes used to refer to both.

Magnesite-chrome refractories are known and have been primarily used in furnaces operated with basic slags or having atmospheres high in iron fumes or dusts. The earliest basic refractories were confined largely to furnace hearths since they did not exhibit sufficient strength at normal furnace operating temperatures to withstand the heavy stresses encountered in walls and roofs. More recent workers have improved upon the high temperature strength characteristics of such materials by a series of technical advances, so that magnesite-chrome brick are now usable not only for furnace hearths but also walls and for fabrication of roof spans.

However, despite the technical advances of workers in this art, magnesite-chrome refractories still are characterized by progressive weakening which adversely affects the life of the furnace structure. This is particularly disadvantageous in brick used in the open hearth furnace roof. In the open hearth steel furnace, it is a comparatively simple task to repair failures in the end and side walls, but failure of the roof normally ends the campaign life.

To understand the technological advances and progress which have been made in the magnesite-chrome refractory field, and to more nicely define the advance that this invention represents, it is felt the characteristics of the materials themselves and the manufacturing techniques involved will be of assistance.

Refractory magnesia is made by "dead burning" the mineral magnesite ($MgCO_3$), or such magnesium compounds as the hydrate or the chloride, to obtain a residual dense grain of magnesium oxide of stable character. In essence, the term "dead burning" denotes the stable and non-reactive character of the magnesium oxide grain which results. The hydrate is commonly precipitated from seawater or other brines to obtain a high purity (95+% MgO) material.

Refractory chrome ores, and for that matter other chrome ores, are obtained from natural deposits. Refractory chrome ore consists of a solid solution of minerals containing at least $Cr_2O_3$, $MgO$, $Al_2O_3$ and iron oxides with a siliceous mineral gangue. On an oxide basis, refractory chrome ore usually analyzes from about 2 to 6% of $SiO_2$. Refractory technologists have come to recognize that this silica will be present as minerals of low melting point such as, for example, serpentine.

It has been approximately two decades since the discovery that it was commercially feasible to convert these low melting point silicate minerals to compounds of higher refractoriness by reacting them with magnesia. In brick mixes this required combining the chrome ore with fine ground magnesia, and then firing them to obtain the desired refractory product. In the fired refractory shapes, the silica minerals formed as films about the grains of magnesia and chrome ore and were discovered to have been converted to minerals of higher melting point, such as forsterite ($2MgO \cdot SiO_2$). Such refractory shapes, in service, exhibited the ability to withstand load to temperatures several hundred degrees higher than prior brick. With this discovery, the technology which developed was primarily a silicate technology since it was the properties of the silicate films, however improved, which governed performance in service.

In more recent years, a newer technological situation has developed as materials of greater purity have become available. By beneficiation, chrome ores with a silica content as low as 1 to 2% are now available. An equally important change has occurred in commercially available refractory magnesia which now commonly analyzes 95% MgO and even 97 to 99+% MgO. In these relatively pure refractory magnesias, silica is present only as a minor portion of that fraction which comprises the remainder of the material.

With this reduction in impurity content, and particularly the reduction of silica, there is insufficient silicate to coat the chrome and magnesia grains. Thus, the silica or silicates no longer wholly control the major refractory characteristics of the magnesite-chrome refractory shapes which are formed. At first blush, the reduction in silicates had been considered an important and desirable advance in the art, since the possibility of utilizing the full refractoriness of chrome ore and magnesite refractory materials appeared possible. With the increased refractoriness, it was thought furnaces might operate readily at temperatures of 3200° F. and higher, whereas, previously, such high temperatures could only be accomplished by use of the elaborately engineered framework.

However, a serious problem has become evident with these purer and relatively silicate-free raw materials. The subordination of the included natural silicates has left nothing to function as a bonding mechanism to provide adequate operating strength necessary at high temperatures. One of the problems is that the chrome minerals and magnesia, being dissimilar mineralogically, do not readily bond to one another, they do not crystallize in the same system, and any crystallization bonds or linkages from the chrome spinel to magnesia are inherently foreign to their mineralogical nature. Even when one is successful in obtaining a refractory shape or brick from combinations of chrome ore and magnesia which would exhibit strength upon fabrication, it progressively weakens as the temperature of use increases, and as the temperature of the product rises and falls (as in the process of a metallurgical heat or melt), shows a distressing lack of internal structural bonding which is needed at upper operating temperatures. This is believed to be due, in a large measure, to the difference in reversible thermal expansion of the crystalline magnesia (periclase) and the chrome mineral. Magnesia has a relatively high thermal expansion of $15 \times 10^{-6}$ inches, per inch per degree centigrade, and the chrome minerals typically exhibit a thermal expansion of only $8 \times 10^{-6}$ inches, per inch, per degree centigrade. Thus, when using together relatively pure chrome ore and magnesia, these materials having great contrast in thermal expansion, as the temperature is raised or lowered, disruption of any existing bonds occurs, thereby progressively weakening the product, endangering the stability of the structure.

Some workers have suggested that use of a soluble chrome salt in the dead burning of the magnesia might be the answer, and others have suggested that a high degree of size reduction of both the chrome ore and the magnsia (as fine as −200 mesh to obtain a uniform, homogeneous system) would produce the desired strong bonding and good strength characteristics during cyclic variation in operating temperatures. However, many chrome salts introduce other harmful chemicals such as alkalies. Others are highly insoluble or soluble to only a limited degree, thus creating problems in introducing sufficient material into the refractory being fabricated. The fine ground or homogeneous system has exhibited a propensity to spalling and cracking, which might have been expected, since a great mass of refractories technology teaches that dense fine-grained homogeneouse structures are deficient in these properties. Also, as might be expected from the marked tendency to spall and break, the homogeneous product has a tendency to be somewhat brittle. The brittleness may be due in some part to the fact that very fine division produces in firing a product which, in effect, is similar to a fused grain in physical characteristics. And it goes without saying, size reduction, which is one of the more expensive facets of fabricating these types of mixes, increases cost to an undesirable degree.

Accordingly, it is an object of this invention to provide an improved refractory material and methods of fabrication thereof. Another object of the invention is to provide improved refractories compounded of mixtures of high purity chrome ore and high purity magnesia, for use in making brick; which brick have good strength and operate satisfactorily under repeated and wide changes in operating temperatures.

It is another object of this invention to provide improved refractory aggregate grains of chrome ore and magnesia, which grains may be used in making brick which exhibit excellent strength under high operating temperatures, and which brick do not lose their strength when subjected to the cyclic variations of temperature encountered in repeated heating and cooling of a metallurgical furnace.

It is yet another object of this invention to provide a method of economically making high purity chrome-magnesia and magnesia-chrome refractories.

Briefly, according to one aspect of this invention, there is taught a method of utilizing low silica ores and high purity magnesia to obtain refractory products, in which the chrome ore and magnesia appear as a heterogeneous solid solution of mixed crystals, preferentially attached to each other through the phenomena of solid-state diffusion. In one embodiment, this method comprises fabrication of a chrome ore-magnesia refractory utilizing suitably ground chrome ore and caustic magnesia. The major portion (about 75%) of the chrome ore fraction is ground to about $-3+65$ mesh with a minor amount of $-65$ mesh fines, and the magnesia fraction substantially all $-65$ mesh. The resulting mixture is briquetted and fired to above 3000° F. The briquettes are ground to about $-3+65$ mesh, and are used as an aggregate in a mixture with more finely divided additional chrome ore and/or magnesia in the range of $-65$ mesh. This mix is formed into brick and fired at no more than 3050° F.

A more detailed understanding, further features, and other objects and advantages of this invention will become readily apparent to those skilled in the refractory and mineralogical arts, from a study of the following detailed description with reference to the appended exemplary drawings.

We have discovered that one manner of achieving a strong and lasting attachment between chrome ore and magnesia grains in a refractory system is to diminish their disparity of crystalline and chemical makeup. The magnesia, except for its minor impurities (this is considering a 95+% grade magnesia), is a simple one-component material. In comparison, chrome ore is comprised principally of a complex mineral system of the general formula $RO \cdot R_2O_3$, where $RO$ may be $FeO$ or $MgO$, and in which the $R_2O_3$ contains $Cr_2O_3$, $Al_2O_3$, and frequently $Fe_2O_3$. It has been observed that this chrome ore complex may be, in part, decomposed by oxidation on heating so that an $R_2O_3$ phase concentrates at the surface of the grains. This $R_2O_3$ concentrate is an $Fe_2O_3$ material which is both an oxidized $FeO$ and naturally occurring $Fe_2O_3$ with at least minor dilution with $Cr_2O_3$ and $Al_2O_3$. This $R_2O_3$ concentrate has an effect on achieving the improved refractories according to the instant invention which is discussed in more detail hereafter.

Figure 1:
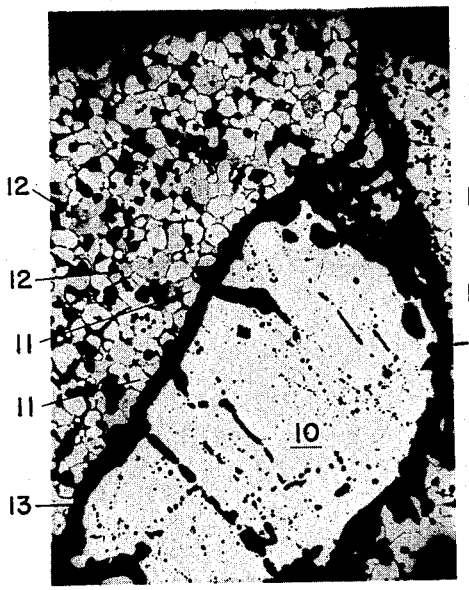
FIG. 1 is a photomicrograph of a previously utilized 70 x 30 magnesia-chrome composition at a linear magnification of 55×.
Figure 2:
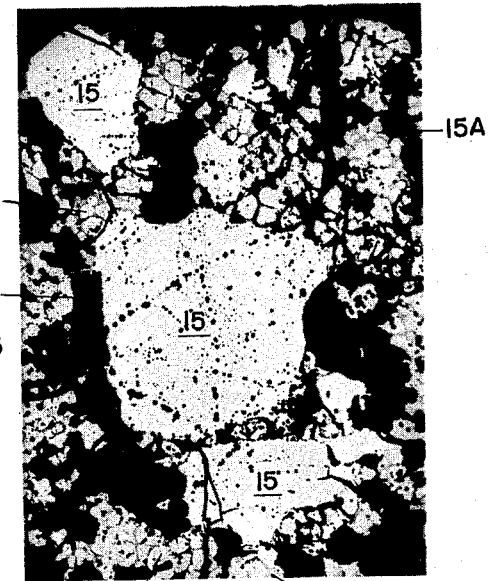
FIG. 2 is a photomicrograph of a previously used 70 x 30 chrome-magnesia composition at a linear magnification of 55×.

A better understanding of the chemical and mineralogical phenomena involved in the fabrication of chrome ore and magnesia brick will be had by reference to the drawings. FIG. 1 is a photomicrograph of a brick fabricated of a conventional grind of relatively pure chrome ore and relatively pure magnesia (and by conventional, it is intended to infer commercially-available materials in a coarser graded brickmaking size range). The brick was subjected to a burn of 3000° F. In the resulting brick, the large white grains 10 are chrome ore particles, the small particles 11 are magnesia particles, the intermediate shade small particles 12 are forsteritic or silicate grains, and all black areas are voids. This photomicrograph is clearly indicative of a lack of attachment or binding matrix between the relatively larger chrome particles 10 and the magnesia particles 11. Note that a void 13 extends substantially entirely peripherally of the chrome ore particles. These peripheral voids 13 appear to occur in cooling and result, in many instances, in loose particles of chrome ore which are very easily dislodged from the brick. FIG. 2 is indicative of another but finer conventional grind utilized to fabricate a chrome ore brick. In FIG. 2, the white particles 15 are chrome ore, the small particles 14 are magnesia particles, the intermediate gray areas 15A are forsteritic or silicate deposits, and the black areas 16 are voids. This brick was also subjected to a burn of about 3000° F. It should be noted that there are still void areas 16 substantially peripherally of the chrome ore particles, although there is minor forsteritic filming 17. Such a brick is also, upon cooling, subject to losing some of its chrome ore particles, spalling and cracking.

The poor bonding strength of brick of the type shown in FIGS. 1 and 2 appears to be the result of interconnected or substantially interconnected peripheral voids about the included chrome ore particles and a degree of mineral attachment insufficient to withstand the stresses resulting from the varying coefficients of thermal expansion between the chrome ore and magnesia particles.

Figure 3:
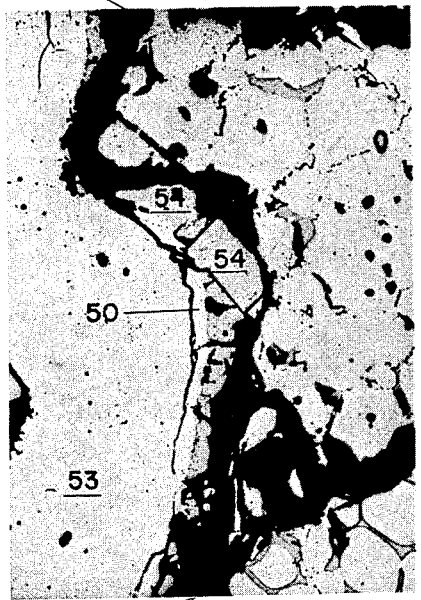
FIG. 3 is a photomicrograph of a previously utilized 80 x 20 magnesia-chrome composition at a linear magnification of 150×.

It was thought that much harder burning, for example a 100 to 250° F. increase over the 3000° F. burn, would increase the strength of attachment between the chrome ore and magnesia particles. It did in fact have this effect, but in burning to such temperatures the brick became distorted and deformed as a result of the impurities naturally present. FIG. 3 illustrates the results of this approach. The chrome ore particles are indicated by reference numerals 53, and the magnesia particles by numerals 54. Even though somewhat better particle attachment resulted, as indicated at 50, upon cooling peripheral void areas 51 still resulted about larger or coarser particles in the brick. This was apparently due to the silicates which partially filmed the coarser particles and which were destroyed on cooling.

Were it not for the problem of deformation and certain limitations of grain sizing, higher firing temperatures, even though extremely costly to maintain, might be useful in achieving some high temperature strength. However, we have discovered a means of achieving the desired magnesia to chrome ore particle attachment without brick deformation, spalling, or undesirable cracking, and which provides outstanding properties at high operating temperatures, including maintenance of good strength through the cyclic temperature variations encountered during heating and cooling of furnaces. In essence, this is comprised of pre-reacting a substantial fraction of the grain of the brick batch under conditions which thereafter allow the brick to be burned at moderate and non-deforming temperature and to produce an excellent product.

According to the invention, relatively coarse ground chrome ore (−3+65 mesh) and finely divided (−65 mesh) caustic or lightly calcined magnesia are mixed together, briquetted into small shapes at high pressure, fired at temperatures high enough to induce strong magnesia to chrome ore mineral attachment; thereafter, crushed and sized, and this crushed and sized intermediate product used as more than 50%, by weight of a refractory brick composition. The remaining percentage, by weight, of the composition may be either finely divided (−65 mesh) chrome ore or dead burned magnesia. All the chrome ore used is preferably substantially free of silica and in any case less than 5 to 6%, by weight.

Figure 5:
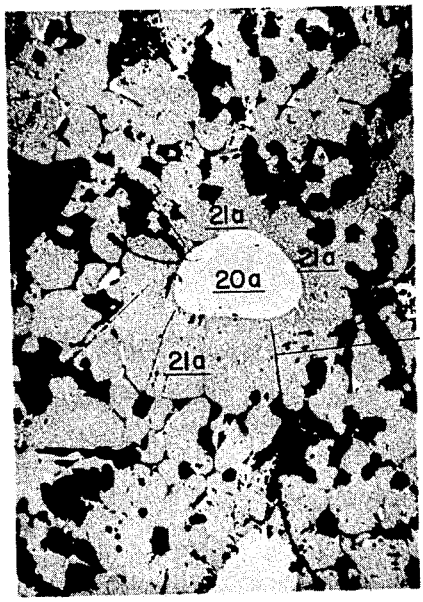
FIG. 5 is a photomicrograph of another brick according to the concepts of this invention at a linear magnification of 150×.
Figure 4:
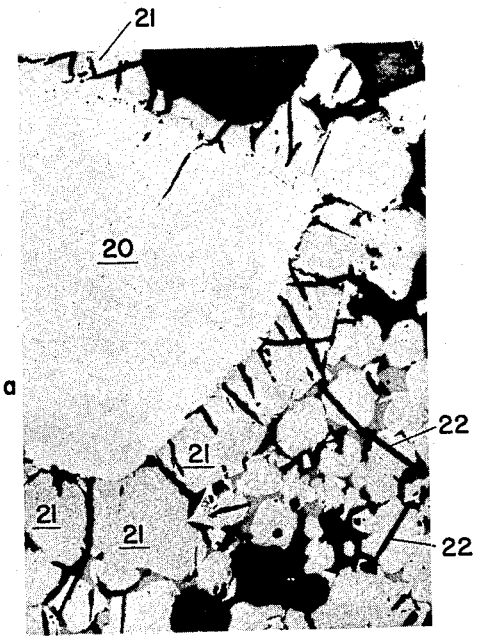
FIG. 4 is a photomicrograph of a brick fabricated according to the concepts of this invention at a linear magnification of 150×.

Brick so formulated are illustrated in FIGS. 4 and 5. Note in FIG. 4 that the chrome ore particles 20 are directly attached to a plurality of magnesia particles 21, that there is no peripheral void about the chrome ore particles, and that any cracking is tessellated, such as at 22, is substantially perpendicular to the boundaries between the magnesia and chrome ore particles, and any cracks or voids are of relatively short length. In the brick of FIG. 5 (utilizing the same reference numerals as applied in FIG. 4 with an "a" suffix), a smaller chrome ore particle is shown which also exhibited excellent direct attachment.

The precise phenomena which produce our excellent direct attachment are not fully understood. However, it is known that the FeO portion of the $RO \cdot R_2O_3$ complex which is chrome ore, is converted to $Fe_2O_3$, by oxidation during firing, and that this tends to migrate from the chrome ore particles. At the very highest temperatures, oxidation is retarded but the migration is greatly accelerated. This results in an unstable condition in the chrome ore particles, and it appears that the displaced or exudated iron oxide is replaced at least in part with MgO from the magnesia as a result of solid-state diffusion to produce a heterogeneous solid solution of mixed crystals.

In a preferred embodiment, a mixture of −3+65, substantially silica-free chrome ore and −65 mesh, 95+% purity, caustic magnesia is prepared in a ratio, by weight, of 20 to 60% chrome ore and 80 to 40% magnesia. The mixture is charged to briquetting rolls such as the well known Komarek-Greaves machine, and the resulting shaped articles are the charge for a subsequent sintering. The technique of briquetting appears to require nothing beyond the characteristics of such a machine, e.g., pressures of about 10,000 to 20,000 p.s.i. Such modern briquetting rolls are capable of achieving pressures in excess of 20,000 p.s.i., but such high pressures do not appear particularly essential.

The resulting briquettes or shaped articles, with or without a curing treatment, and either hot or cold, are charged to a vertical shaft kiln operated on countercurrent heat recuperative principles, and in which the firing chamber is formed by a series of burners placed circumferentially of the shaft, intermediate its ends. We charge the briquettes at the top of such a kiln, and they move downwardly under gravity effect and are discharged from the bottom. The kiln gases move upwardly countercurrent to the movement of the briquette charge, resulting in preheating of the briquettes as they approach the burner area, and serve to elevate the temperatures obtainable in the firing chamber to, for example, 3500° F., which is far in excess of those which deform and completely ruin the shape of refractory brick. In fact, temperatures above 3000° F. will sometimes result in deformation. However, such deformation and possible sticking as occurs in firing of the briquettes does not impair their value since, in any case, they are thereafter crushed to formulate a brick batch.

In an exemplary test, coarse chrome ore and finely divided magnesia briquettes fabricated in the above manner were fired to 3200° F., and then crushed and sized to −10+65 mesh (aggregate C of the table infra). The crushed and sized briquettes were used as about 67%, by weight, of a brick mix and combined with about 33%, by weight, of (−65 mesh) finely divided magnesia. A brick formed from this mix was successfully fired at an ordinary brick-burning temperature of 2900° F. No single characteristic of the resulting brick was more significant than its strength at high operating temperatures without spalling. For example, such brick were held at 2250° F. to equalize heat distribution, and tested for transverse strength. The transverse strength was found to be 1030 pounds per square inch. Comparative samples, burned to the same temperature, but not having the advantage of our above 50% pre-sintered materials, under similar test conditions, had much lower modulus of ruptures.

The following examples are indicative of actual laboratory testing.

|  | Conventional Mg/Cr Brick | Conventional Mg/Cr Brick | Special Mix I | Special Mix II | Special Mix III |
|---|---|---|---|---|---|
| Mix: | | | | | |
| Chrome Ore, coarse [1]_____percent__ | 30 | | | | |
| Low Silica MgO, coarse [2]_____do___ | 35 | 35 | | | |
| Low Silica Chrome, coarse [3]_____do___ | | 30 | | | |
| Aggregate A (electrically fused) [4]_____do___ | | | 65 | | |
| Aggregate B (sintered, all −65 mesh) [5]__do___ | | | | 67 | |
| Aggregate C (sintered, coarse chrome)____do___ | | | | | 67 |
| Low Silica MgO, ball mill fines [6]_____do___ | 35 | 35 | 35 | 33 | 33 |
| Brick Burned at_____ | Cone 30 | | | | |
| Bulk Density, p.c.f._____ | 187 | 191 | 190 | 183 | 183 |
| Modulus of Rupture, p.s.i.: | | | | | |
| At room temperature_____ | 340 | 240 | 1,080 | 1,030 | 1,600 |
| At 2,300° F._____ | 300 | 275 | 1,570 | 920 | 1,350 |
| Thermal Shock Resistance (ASTM Spalling Test For Super Duty Brick, 3,000° F. Preheat, Water Spray): | | | | | |
| Weight Loss in test_____percent__ | 0.0 | 0.0 | 4.6 | 10.3 | 0 |
| Cracking_____ | None | None | Severe | Severe | None |

[1] $SiO_2$ about 5½%, by weight; −4+28 mesh (Tyler).
[2] $SiO_2$ about 1%, by weight; −4+28 mesh (Tyler).
[3] $SiO_2$ about 2%, by weight; −6+28 mesh (Tyler).
[4] −4+28 mesh, about 60% Chrome Ore—40% Magnesia.
[5] −4+28 mesh, about 40% Chrome Ore—60% Magnesia.
[6] $SiO_2$ about 1%, by weight; 55% −325 mesh (Tyler).

In these tests, Special Mix III was according to this invention, and substantiated good strength and resistance to cracking and spalling which the other test specimen did not equal.

Testing has indicated that the pre-reacted, sintered and crushed intermediate should comprise at least about 50% of the brick mix, using less appears to separate pre-reacted particles from one another in an excessively diluting ground-mass of other materials less readily unitable at permissible brick firing temperatures. Based on experience, this does not occur if the sintered intermediate comprises more than 50% of the brick-making mix.

In summary:

As increasingly pure raw materials (particularly those lower in silica) are employed in making magnesite-chrome refractories for primary steel furnaces, etc., it has been observed in the field that high temperature strength of the refractories has proportionately decreased and has reached a point of being insufficient to bear required structural loads.

Magnesite and chrome ore are difficult to attach directly (without the aid of intermediate minerals) because of considerably different physical properties (crystal form, thermal expansion, etc.). However, prior workers suggested that attachment could be obtained in refractories, otherwise made in the usual manner, if burned very hard (more than 3000° F.). But this is an expensive process, particularly because it results in loss of ware to sticking and deformation of the brick in burning with consequent rejections.

In one aspect, what we have discovered is that a prereacted chrome ore and magnesite refractory grain can be made which will yield refractory brick with very good hot strength and very good spalling resistance. The chrome ore initially employed to make the refractory grain must be much coarser than the magnesite used. If the magnesite used is a caustic type resulting from relatively low temperature calcination of $Mg(OH)_2$, for example, it naturally will be largely —65 mesh in particle size and suitable for our process. If hard or dead burned magnesite is employed, it must be milled so that substantially all is —65 mesh.

As noted above, the initial chrome ore must be considerably coarser than the magnesite and should, in any case, contain very little —100 mesh material. We have used chrome ore containing as much as 30% +10 mesh material with good results, but the amount of +10 mesh chrome usable is governed in a practical manner by the natural sizing of low silica chrome ore sources and by the wear pattern on the briquetting rolls.

The screen analysis of three types of chemically suitable beneficiated chrome ore is shown in the table below. They have a rather sandy texture and do not contain much +10 mesh material, but are suitably low in —100 mesh material. The silica content should be less than 5 to 6% by weight.

| Screen Analysis | A | B | C |
| --- | --- | --- | --- |
| Pass 8 on 10 mesh_____percent__ | 3 | 6 | |
| Pass 20 on 28 mesh_____do____ | 13 | 36 | 27 |
| Pass 48 on 65 mesh_____do____ | 58 | 39 | 55 |
| Pass 150 mesh_____do____ | 26 | 19 | 18 |

The firing range for briquettes should be above 3050° F. and preferably above 3200° F. The brick firing range must be less than 3050° F. and is preferably 2800 to 3000° F.

Magnesite-chrome brick, made in a conventional manner with either regular or low silica chrome ore, have high thermal shock resistance but low strength at 2300° F. or in the load test. Strength of magnesite-chrome brick was found to be improved by use of a homogeneous electrically-fused grain (see Special Mix I). However, this strength is only achieved by sharp loss in thermal shock resistance. Similarly, in Special Mix II, homogeneous grain produced by sintering fine chrome ore and fine magnesite had improved strength, but it also had low thermal shock resistance. But we discovered, that by use of a coarse chrome ore sintered into a grain with fine magnesite (see Special Mix III), a brick of high strength (as indicated by modulus of rupture at 2300° F. and hot load test) was achieved without loss of thermal shock resistance.

Having thus described the invention in detail and with sufficient particularity as to enable those skilled in the art to practice it, what is desired to have protected by Letters Patent is set forth in the following claims.

We claim:

1. A refractory shape made from a size graded, refractory brickmaking batch, said batch consisting essentially of a major portion of refractory aggregate grain, and a minor portion of finely divided material selected from the group consisting of low silica refractory chrome ore, high purity magnesia, and mixtures thereof, said magnesia being of at least 95% MgO content, by weight and on the basis of an oxide analysis; said aggregate grain constituting substantially the entire coarse fraction of the batch and characterized by a combination of relatively coarse chrome ore particles and relatively fine magnesia particles directly attached to each other, the area of attachment of the particles microscopically characterized as a heterogeneous solid solution of chrome ore spinel and magnesia crystals, said particles being substantially free of silicate filming, said shape being fired at a temperature between 2800 and 3050° F.

2. A refractory shape made from a size graded, refractory brickmaking batch, said batch consisting essentially of a major portion of a prereacted, sintered, and crushed, low silica refractory aggregate grain, and a minor portion of material selected from the group consisting of low silica refractory chrome ore, high purity magnesia of at least 95% MgO content, by weight and on the basis of an oxide analysis, and mixtures thereof, said grain constituting substantially the entire coarse fraction of the batch and characterized by a combination of relatively coarse chrome or particles and relatively fine magnesia particles directly attached to each other, the area of attachment of the particles microscopically characterized as a heterogeneous solid solution of chrome ore spinel and magnesia crystals, said particles being substantially free of silicate filming, said shape being fired at a temperature between about 2800 and 3050° F.

3. The shape of claim 2 in which the aggregate grain is about —3+65 mesh.

4. A method of making a prereacted, sintered refractory aggregate grain comprising the steps of, mixing from 20 to 60%, by weight, of substantially silica-free —3+65 mesh chrome ore, and from 80 to 40% of high purity magnesia substantially all —65 mesh, the magnesia being at least 95%, by weight, MgO, on the basis of an oxide analysis, charging the mixture to means for forming small briquette-like shapes, and hard firing the resulting shapes at a temperature in excess of 3050° F. until the chrome ore and magnesia constituents appear as a heterogeneous solid solution of chrome ore spinel and magnesia crystals, said constituents being substantially free of silicate filming.

5. A method of making a prereacted, sintered, refractory aggregate grain comprising the steps of, mixing from 20 to 60%, by weight, of substantially silica-free —3+65 mesh chrome ore, and from 80 to 40% of high purity magnesia substantially all —65 mesh, the magnesia being at least 95%, by weight, MgO, on the basis of an oxide analysis, charging the mixture to means for forming small briquette-like shapes, and hard firing the resulting shapes at a temperature in excess of 3050° F. until the chrome ore and magnesia constituents appear as a heterogeneous solid solution of chrome ore spinel and magnesia crystals substantially free of silicate filming, and crushing and sizing the resulting burned shapes to a brickmaking graded size range.

6. The method of making a refractory brick comprising the steps of, mixing from 20 to 60%, by weight, of substantially silica-free −3+65 mesh chrome ore, and from 80 to 40% of high purity −65 mesh magnesia, the magnesia being at least 95%, by weight, MgO, on the basis of an oxide analysis, charging the mixture to briquetting rolls, and hard firing the resulting briquettes at a temperature sufficient to cause the chrome ore and magnesia constituents to appear as a heterogeneous solid solution of chrome ore spinel and magnesia crystals substantially free of silicate filming, crushing and sizing said briquettes to produce aggregate grain in the range −3+65 mesh, mixing said aggregate grain with −65 mesh material selected from the group consisting of low silica chrome ore, high purity magnesia of at least about 95% MgO content, by weight on an oxide analysis, and mixtures thereof, said aggregate grain comprising more than 50% of the resulting mixture, forming brick from the resulting mixture, and firing said brick at a temperature between 2800 and 3050° F.

7. The method of claim 6 in which the aggregate grain comprises about 70% of the mixture from which the brick is formed.

8. The method of claim 6 in which the hard firing of the briquettes is carried out above 3050° F.

9. The method of claim 6 in which the magnesia in the charge to the briquetting rolls is lightly calcined magnesia.

10. A fired basic refractory shape made from a batch consisting essentially of low silica chrome ore and high purity magnesia of at least 95% MgO content, by weight and on the basis of an oxide analysis, at least a major portion of the chrome ore and magnesia being in the form of prereacted and sized grain consisting of bodies of a mixture of coarse chrome ore and fine magnesia fired to temperatures above 3050° F. and characterized by direct particle to particle attachment between the chrome ore and magnesia, the area of attachment of said particles in said bodies microscopically characterized as a heterogeneous solid solution of chrome ore spinel and magnesia crystals, said shape microscopically characterized by direct chrome ore to magnesia particle attachment substantially free of intermediate silicate filming and tessellated internal cracking across the magnesia-chrome ore particle interfaces.

11. In fired basic refractory shapes made from a size graded brickmaking batch mixture of chrome ore and magnesia, the improvement which comprises at least a major portion of the batch being size graded prereacted refractory aggregate grain consisting essentially of 20 to 60% chrome ore having an $SiO_2$ content, by weight and on the basis of an oxide analysis, of no more than about 5%, and from 80 to 40% of magnesia of at least 95% MgO, by weight and on the basis of an oxide analysis, said grain characterized by direct chrome ore particle to magnesia particle attachment substantially without intervening silicate filming, said shapes fired at temperatures between about 2800 and 3050° F.

12. The basic refractory shapes of claim 11 in which the prereacted refractory aggregate grain constitutes from 50 to 70%, by weight, of the total weight of the batch.

13. Fired basic refractory shapes according to claim 11 in which the total $SiO_2$ content, by weight and on the basis of an oxide analysis, of the refractory aggregate grain is no more than about 4%.

14. A fired basic refractory shape made from a size graded refractory brickmaking batch consisting essentially of chrome ore having no more than about 5%, by weight, $SiO_2$, on the basis of an oxide analysis, and magnesia analyzing at least 95% MgO, by weight and on the basis of an oxide analysis, from 50 to 70% of the batch being in the form of prereacted coarsely sized grain of a mixture of coarse chrome ore having no more than about 5% $SiO_2$, by weight and on the basis of an oxide analysis, and fine magnesia analyzing at least about 95% MgO, by weight and on the basis of an oxide analysis, said grain characterized by direct particle to particle attachment between the chrome ore and magnesia which make up said bodies, the area of said attachment being microscopically characterized by substantial freedom from silicate filming and tessellated cracking across chrome ore and magnesia particle interfaces, said shapes being fired at a temperature between 2800 and 3050° F.

15. The fired refractory of claim 14 in which the total $SiO_2$ content, by weight and on the basis of an oxide analysis, of the total batch is less than about 4% and in which the shapes are fired at a temperature of about 2900° F.

16. A fired, basic refractory shape consisting essentially of low silica chrome ore spinel particles and magnesia particles, the magnesia being of at least 95% MgO content, by weight and on the basis of an oxide analysis, said shape containing 20 to 60% chrome ore, said shape microscopically characterized by chrome ore spinel particles and the magnesia particles being directly attached to each other without intervening silicate filming, there being tessellated cracking across the area of attachment between the chrome ore spinel particles and the magnesia particles, and said shape having a modulus of rupture at 2300° F. which exceeds about 1000 p.s.i.

References Cited by the Examiner
UNITED STATES PATENTS 2,060,697  11/36  Seil _____ 106—59
3,108,007  10/63  Heuer _____ 106—59

TOBIAS E. LEVOW, *Primary Examiner.*

JOHN H. MACK, *Examiner.*